Patented June 5, 1951

2,555,489

UNITED STATES PATENT OFFICE 2,555,489

RESINOUS ARYL SILICATE-ALDEHYDE REACTION PRODUCT AND METHOD OF MAKING SAME

Alfred Hirsch, Painesville, Ohio, assignor to Diamond Alkali Company, Cleveland, Ohio, a corporation of Delaware No Drawing. Application December 2, 1947, Serial No. 789,337

11 Claims. (Cl. 260—67)

This invention relates to new and useful resinous compositions of matter incorporating aryl esters of orthosilicic acid and aldehydes or aldehyde yielding substances and to methods of making the same. More particularly, the invention relates to thermosetting resinous compositions of matter incorporating phenol or substituted phenol esters of orthosilicic acid with aldehydes or aldehyde yielding substances and to methods of making the same.

The thermosetting resinous compositions obtained according to the teachings of the present invention have been found to possess physical and chemical properties intermediate those of the resins of purely organic character, such as the phenol-formaldehyde type resins, and those embodying organic characteristics with some inorganic characteristics, such as the siloxane resins. For example, the resinous compositions of the present invention possess a "curing" or condensation rate indicative of thermosetting properties comparable to that of the phenol-formaldehyde type condensation products under the same conditions, while at the same time possess enhanced thermal stability arising in part from the inorganic constituent thereof. Thus, there is found in these new resinous compositions a relatively rapidly thermosetting material having outstandingly high thermal stability. These properties of relatively rapid thermosetting rate and thermal stability of the "cured" product make the resinous compositions of the present invention readily adaptable to a wide variety of uses not entirely satisfactorily enjoyed by either the phenol-formaldehyde type resins or the siloxane resins.

Thus, they are particularly useful when compounded by molding under pressure into shapes, parts, objects and the like where relatively great strength and heat stability are required. This application is especially advantageous when fillers and the like are combined with the resins, as will be more fully described hereinafter. Other particularly advantageous applications include high temperature resistant coatings, such as fireproof paints and other protective media, the resinous materials preferably being disposed in a solvent prior to such applications and preferably heat treated after application to the surface to be protected. An application of especial value is in the lining of containers for food or other perishable commodities, it having been found that films of the resins of this invention are substantially completely inert to the contents of the container. The resin may suitably be applied to such surface in any convenient manner, such as in a solvent.

It is also characteristic of the compositions of the present invention that they are readily obtained by reaction between the ester and the aldehyde in intimate contact with each other under relatively mild heat and agitation and preferably at atmospheric pressure. After the application of heat for a short time to initiate the reaction, the reaction thereafter becomes in substantially all cases entirely exothermic, the character of the reaction being such, however, that control by cooling is achieved with relative ease.

In accordance with the present invention, aromatic esters of orthosilicic acid are reacted with an aldehyde, such as formaldehyde, or aldehyde yielding substances, such as paraformaldehyde, in the presence of a catalyst, which may be either alkaline or acid in nature, such as hexamethylenetetramine, benzoic acid, or anhydrous hydrogen chloride. Reaction occurs usually after the ingredients are heated together, with agitation, the reaction being exothermic and quite vigorous, though easily controllable by cooling. It is preferred to maintain substantial temperature control of the ingredients during the reaction period in order to prevent possible excessive condensation of the reaction products and preferably to prevent the condensation from advancing into the thermosetting range, in which condition the thermoplastic properties of the resin are lost with consequent substantial loss of molding properties.

The aromatic esters under consideration herein may include as their aryl constituents phenolic or alkylated phenolic residues. Examples of aryl esters which may be used in the practice of the method and to obtain the products of this invention include such esters as tetraphenyl orthosilicate, tetracresyl orthosilicate, tetra xylyl silicate, methyl tricresyl silicate, phenyl tricresyl silicate, and the like. These materials may be used in their pure state or in admixture with each other or, if desired, may be used in relatively impure state, it having been found that, for example, still bottoms from tetracresyl silicate or mixed cresyl phenyl silicate distillation, which comprise relatively tarry dark materials, can be used as starting materials in the process of the present invention, the resulting resinous substances obtained therefrom having properties comparable to the properties obtained when relatively pure starting materials are used. In addition, it will be appreciated that mixtures of such esters, whether pure or crude with phenols or alkylated phenols, may also be employed.

Likewise, mixed esters obtained by reacting a mixture of phenols or a mixture of alkali metal phenolates, with an elemental halide or an organic radical halide, such as silicon tetrachloride, may be used in the practice of the present invention without departing from the scope thereof.

As the aldehyde yielding substance to be reacted with the ester as disclosed above, paraformaldehyde has been found to be preferable, particularly in view of the ease of operation with which it may be reacted with the desired ester. Other aldehyde yielding substances, such as metaldehyde and formaldehyde itself, may be used. Thus, as an alternative to the method set forth in the examples appearing hereinafter, it is within the contemplation of the present invention to provide in the presence of an ester, such as is disclosed herein, a catalyst, either an alkaline catalyst such as hexamethylene tetramine, or an acid catalyst such as hydrogen chloride, and to bubble formaldehyde gas through such mixture of catalyst and ester with substantially the same results being obtained.

The chemical constitution of the materials obtained according to the method of this invention is not fully understood at the present time and the following theory of the probable operation of the method is set forth to aid those skilled in the art in practicing the same and is not intended to be limiting upon the scope of the invention herein. It is believed, however, that the reaction between the formaldehyde and the ester comprises a condensation in which two hydrogen atoms of separate benzene rings are combined with an atom of oxygen from the aldehyde to eliminate a molecule of water, the benzene rings being accordingly connected by a methylene group therebetween. According to this theory of the reaction, chains of the ester molecules can form and interlocking of the chains is highly likely, thus accounting for the resinous character of the material as finally cured. It will be appreciated upon comparing these substances with conventional phenol-formaldehyde resins that their molecules incorporate a considerable proportion of the inorganic substituent, silicon, which gives rise to the high heat stability characterizing the materials of the present invention.

In general, the ester material and the aldehyde yielding material may suitably be reacted in equimolar proportion to obtain resinous materials of satisfactory properties. It has been found, however, that both the appearance and the physical properties of the ultimate moldings obtained using the resins of this invention as the binding material, are advantageously altered as the proportion of aldehyde yielding substances is increased, materials of greater hardness and heat stability being thereby obtained. It is, however, in general preferred to employ a molecular ratio of the aldehyde yielding substance to the silicate ester up to 5:1, the resins having a molecular ratio of between 2:1 and 4.5:1 having been found particularly advantageous. The catalyst used to promote the reaction may, of course, be employed in much smaller amounts and is ordinarily used in a molar ratio to the ester employed of about 1/10 or less mol of catalyst to a mol of the ester. In particular, it has been found that the use of mol ratios of catalyst, particularly hexamethylene tetramine below that mentioned above, results in resinous materials having somewhat darker color and which are somewhat softer in their preliminary resinous stage prior to their thermosetting stage and result in somewhat less attractive moldings.

While the resinous materials themselves have interesting properties and uses for the same, such as those suggested above, will occur to those skilled in the art, it is apparent that particularly in view of the thermosetting character of these resins, they will have their principal use in combination with various fillers, fibers, strengtheners and the like, which will tend to enhance the attractive properties already possessed by the materials. Thus, fillers such as paper fibers, wood flour, mica, cotton linters, glass fibers, asbestos fibers, sisal and the like, may be combined with the resins to impart strength thereto, hardeners such as calcium oxide and clay may be employed, pigments to obtain desired colors may be used, and mold and internal lubricants, such as stearic acid, calcium, zinc and other stearates and oleates may be used.

In order that those skilled in the art may better understand the present invention and the method of practicing the same, the following specific examples are offered as illustrative of the various methods to be employed herein. The examples, however, are in no way to be considered as limiting the scope of the invention herein disclosed but merely illustrate the concept thereof as set forth in the specification and appended claims. All parts are by weight unless otherwise indicated.

EXAMPLE I

Part 1

228 parts of tetracresyl silicate, 72 parts of paraformaldehyde, and 7 parts of hexamethylenetetramine, (mol ratio 1:4.8:0.5) are placed in a covered reaction vessel fitted with a driven stirrer. Vigorous agitation of the ingredients within the reaction vessel is started and heat is applied. After the temperature rises to about 100° C., the turbid reaction mixture begins to clear and the temperature then rises sharply. Finally, the reaction mass becomes clear, amber in color, and vigorous ebullition ensues. Shortly thereafter, the mass becomes very viscous and is removed from the reaction vessel and allowed to cool at room temperature, at which time it becomes a hard, brittle solid.

Part 2

The hard, brittle, amber solid is then comminuted and 50 parts of this material are mixed with 50 parts of wood flour, 1 part of carbon black, and $\frac{5}{10}$ part of zinc stearate. A portion of this molding composition is placed in a mold, which in turn is placed in a heated press at 150° C. and 3,000 pounds per square inch pressure. The molded piece is found to have a tensile strength of 5,800 pounds per square inch, flexural strength 7,800 pounds per square inch, compression strength of 24,000 pounds per square inch, impact strength of 0.24 foot pound per inch of notch, and a "Rockwell" hardness of the M Scale of 105.

EXAMPLE II

Part 1

228 parts of a tarry material comprising still bottoms from distillation of tetracresyl silicate, as derived from cresol and silicon tetrachloride and consisting of a crude mixture of tetracresyl orthosilicate, are placed in a reactor similar to the one used in Example I, along with 15 parts of paraformaldehyde, and 14 parts of hexamethylene tetramine. The mixture is vigorously agitated while gentle heat is applied until the temperature reaches 115° C., at which point vigorous ebullition occurs. After the ebullition has started, the temperature rises sharply to about 195° C. and the reaction mass quickly sets up to a very viscous to solid mass. On removing the reaction mass and cooling to room temperature, a hard, resinous, thermoplastic material is obtained.

*Part 2*

Upon grinding to a fine powder and mixing with an equal portion of wood flour and a small amount of aluminum stearate, and molding, a hard, lustrous, molded article is obtained. Molding is accomplished in a conventional press at 4,000 pounds per square inch pressure and at 150° C.

EXAMPLE III

*Part 1*

200 gms. of tetraphenyl silicate, 15 gms. of paraformaldehyde, and 14 gms. of hexamethylene tetramine (mol ratio 1:1 to 0.1) are reacted as described in Example I. The reaction occurs as readily as is described in that example.

*Part 2*

The resinous product obtained in Part 1 of this example, after hardening, is ground to a powder. 50 gms. of the resin, 50 gms. of wood flour, 1 gm. of carbon black, and 0.5 gm. of zinc stearate are molded as in Example I, Part 2, and the properties of the molding are found to be comparable to the material described in that example.

EXAMPLE IV 114 gms. of tetracresyl silicate, 22½ gms. of paraformaldehyde, and 3½ gms. of hexamethylene tetramine are placed in a 3-neck, round-bottom flask equipped with a reflux condenser, a mechanical stirrer and a thermometer. 75 cc. of toluene are added and the mixture is heated with stirring to 100° C., whereupon a reaction is evidenced by evolution of bubbles and spontaneous temperature rise to 107° C. Heat is applied from time to time to maintain the temperature and it is found that boiling and refluxing begin at about 117° C. with the temperature slowly increasing though heat input is constant. During this temperature increase, the solution which is turbid at lower temperatures begins to clear and finally becomes clear, deep red at about 135° C. Thereupon, the resin begins to set up and a solid and liquid phase results. The solid phase is separated and found to comprise a resinous material of substantially the properties of that obtained in Example I.

As noted above, the reaction may suitably be catalyzed either by acid or alkaline catalysts. The following example sets forth a manner in which the reaction may be carried out employing an acid catalyst.

EXAMPLE V 62 gms. of tetracresyl silicate, 20 gms. of paraformaldehyde, and 3 gms. of benzoic acid are placed in the apparatus used in Example I. Heat is applied gently to the flask until a temperature of about 115° C. is reached, whereupon the reaction proceeds in substantially the manner of the reaction of Example I, except that the reaction appears not to be nearly as violent as in Example I and a considerably greater application of heat is necessary in order to continue the same. Upon the temperature rising to approximately 195° C., the reaction mass becomes clear and of a light, yellow cast and reaction apparently ceases. The resulting resin hardens readily at room temperature and is much lighter in color than that produced by the alkaline reaction.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of forming a resinous material which consists of the steps of contacting a tetrahydrocarbon silicate where three to four hydrocarbon radicals are selected from the group consisting of phenyl and alkylated phenyl and any remaining of such hydrocarbon radicals is methyl, with an aldehyde chosen from the group consisting of formaldehyde, metaldehyde, and paraldehyde in the presence of a catalyst and heating the same to initiate a reaction between said tetrahydrocarbon silicate and said aldehyde.

2. The method as claimed in claim 1 in which an alkaline catalyst is used.

3. The method as claimed in claim 1 in which an acid catalyst is used.

4. The method as claimed in claim 1 in which the four hydrocarbon radicals are phenyl.

5. The method as claimed in claim 1 in which the four hydrocarbons are cresyl.

6. A resinous material characterized by high heat resistance and relatively fast thermosetting rate which consists of the reaction product of claim 1.

7. A resinous material as claimed in claim 6 in which the tetrahydrocarbon silicate is tetracresyl silicate.

8. A resinous material as claimed in claim 6 in which the tetrahydrocarbon silicate is tetraphenyl silicate.

9. A molded resinous product consisting of the product of the method of claim 1 molded under heat and pressure with inert fillers.

10. A molded resinous product as claimed in claim 9 in which the tetrahydrocarbon silicate is tetracresyl silicate.

11. A molded resinous product as claimed in claim 9 in which the tetrahydrocarbon silicate is tetraphenyl silicate.

ALFRED HIRSCH.

REFERENCES CITED

The following references are of record in the file of this patent:

UNITED STATES PATENTS

| Number | Name | Date |
| --- | --- | --- |
| 1,439,056 | Baekeland | Dec. 19, 1922 |
| 2,053,850 | Sturken | Sept. 8, 1936 |
| 2,182,208 | Nason | Dec. 5, 1939 |
| 2,224,815 | Glycofrides | Dec. 10, 1940 |